(12) United States Patent
Rowland et al.

(10) Patent No.: US 10,378,635 B2
(45) Date of Patent: Aug. 13, 2019

(54) CAM FOLLOWER ROLLER ASSEMBLY

(71) Applicant: Kann Manufacturing Corporation, Guttenberg, IA (US)

(72) Inventors: Jared Rowland, Dyersville, IA (US); Kenneth D. Goedken, Dubuque, IA (US); Marlin Johnson, Guttenberg, IA (US); Roger Taake, Elkader, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 0 days.

(21) Appl. No.: 15/487,130

(22) Filed: Apr. 13, 2017

(65) Prior Publication Data
US 2017/0299038 A1    Oct. 19, 2017

Related U.S. Application Data

(60) Provisional application No. 62/321,949, filed on Apr. 13, 2016.

(51) Int. Cl.
*F16H 53/06* (2006.01)
*B65F 3/08* (2006.01)
*F16N 21/00* (2006.01)

(52) U.S. Cl.
CPC ............. *F16H 53/06* (2013.01); *F16N 21/00* (2013.01); *B65F 3/08* (2013.01)

(58) Field of Classification Search
CPC .. F16H 53/00; F16H 53/06; B65F 3/02; B65F 2003/0293; B65F 3/08; F16N 21/00; B23Q 5/342; B23Q 5/345; F01L 1/16
See application file for complete search history.

(56) References Cited

U.S. PATENT DOCUMENTS

| | | | | |
|---|---|---|---|---|
| 2,099,660 A | * | 11/1937 | Robinson | F16H 53/06 74/569 |
| 2,318,903 A | * | 5/1943 | Thomas | F16C 13/006 411/401 |
| 4,106,826 A | * | 8/1978 | Marola | F16B 35/04 384/466 |
| 4,113,327 A | * | 9/1978 | Koch | F16B 35/04 384/482 |
| 4,881,828 A | * | 11/1989 | Kato | F16C 13/006 384/127 |
| 4,938,610 A | * | 7/1990 | Kato | F16C 13/006 384/126 |

(Continued)

FOREIGN PATENT DOCUMENTS

| | | | | |
|---|---|---|---|---|
| DE | 9302269 U1 | * | 5/1993 | ............ F16C 13/006 |
| WO | WO-9000689 A1 | * | 1/1990 | ............ F16C 13/006 |

*Primary Examiner* — Adam D Rogers
(74) *Attorney, Agent, or Firm* — Shuttleworth & Ingersoll, PLC; Brett Papendick (57) ABSTRACT

A cam follower roller assembly has a shaft insertable into a roller. The shaft has a zerk in communication with the channel wherein lubricant can be added to the assembly. The design of the assembly in one embodiment is such that a larger shoulder to shaft radius stabilizes the shaft and limits the shaft from rocking or elongating within a mounting hole. When utilized in the application of a loading mechanism and carriage assembly for trash collection vehicles, one embodiment of the cam follower roller assembly provides greater life and easier serviceability.

11 Claims, 7 Drawing Sheets

(56) References Cited

U.S. PATENT DOCUMENTS

| | | | | | |
|---|---|---|---|---|---|
| 5,513,937 | A | * | 5/1996 | Huntoon | B65F 3/043 414/408 |
| 5,531,137 | A | * | 7/1996 | Guilford | F16C 13/006 74/569 |
| 5,772,385 | A | * | 6/1998 | Huntoon | B65F 3/043 414/408 |
| 6,015,237 | A | * | 1/2000 | Ogawa | F16C 13/006 384/475 |
| 6,017,152 | A | * | 1/2000 | Ogawa | F16C 13/006 384/449 |
| 6,056,444 | A | * | 5/2000 | Ogawa | F16C 13/006 137/847 |
| 9,982,768 | B2 | * | 5/2018 | Hartnett | F16N 11/04 |
| 2008/0011119 | A1 | * | 1/2008 | Bartosch | F16H 53/06 74/567 |
| 2012/0111141 | A1 | * | 5/2012 | Shibutani | F16C 33/78 74/569 |

* cited by examiner

CAM FOLLOWER ROLLER ASSEMBLY

CROSS-REFERENCE TO RELATED APPLICATIONS

The present application claims priority to provisional patent application 62/321,949 which was filed on Apr. 13, 2016, and is hereby expressly incorporated by reference in its entirety.

BACKGROUND

The present invention relates to a cam follower roller assembly namely for attachments for a refuse collection vehicle. Cam followers are roller bearings that are designed to follow tracks or cams in a wide range of linear motion systems. These systems include certain moving parts associated with lifting mechanisms and carriage systems associated with the collection of refuse from a refuse collection bin into a collection compartment of the refuse collection vehicle.

The current art of the cam follower roller assembly utilized in the application of loading mechanisms, carriage assemblies and other moving mechanisms for refuse collection vehicles requires disassembly of most if not all of the loading mechanism, carriage assembly or other associated parts in order to service the cam follower roller assembly. This requires greater time and resources for maintenance events, and leads to increased time out of the field for the vehicles associated with the current state of the art.

BRIEF SUMMARY OF THE INVENTION

The cam follower roller assembly has two different embodiments that can be utilized for different applications associated with refuse collection vehicles, as well as non-refuse collection vehicles. A first embodiment has a shoulder on the shaft, while a second embodiment does not have a shoulder on the shaft but instead has a hardened steel bushing insert within the roller. The roller of either embodiment is also greasable after assembly via a grease zerk that flows grease through the body of the shaft and to the roller. Additionally, the shoulder of the shaft in the first embodiment is increased in diameter compared to the state of the art. The increased diameter increases the bearing/clamping surface and also permits a larger shoulder to shaft radius that stabilizes the shaft from rocking or elongating within a mounting hole.

When mounted on certain structures associated with lifting mechanisms and carriage systems of refuse collection vehicles, the cam follower roller assembly can be removed and serviced without having to take apart the entire lifting mechanism or carriage system. The cam follower roller assembly described in this application increases the overall load capacity of the cam follower roller, is more robust in that it is not susceptible to over torqueing when the cam follower roller is installed, and is more forgiving for service replacement where worn assemblies are commonplace.

DETAILED DESCRIPTION OF THE INVENTION

Figure 1:
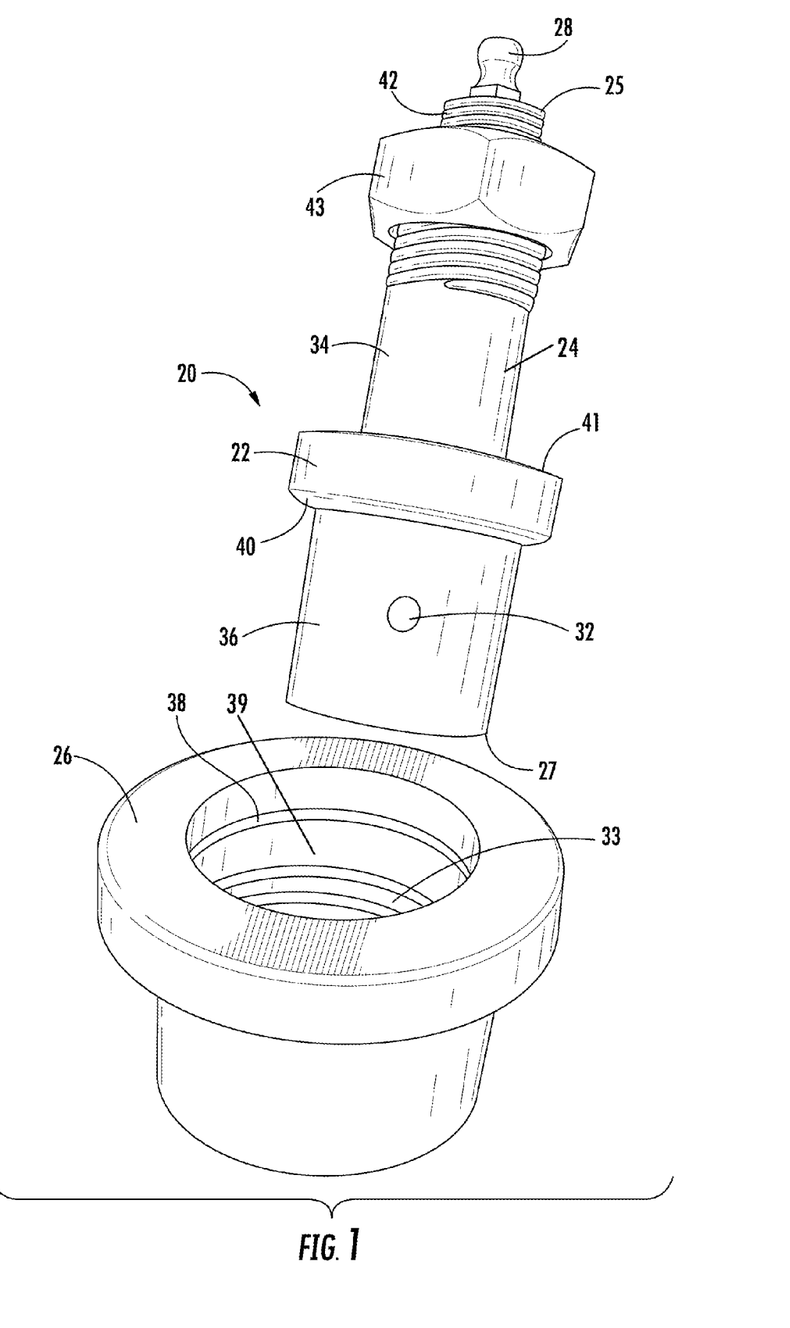
FIG. 1 is a perspective view of a first embodiment of a cam follower roller assembly.
Figure 2:
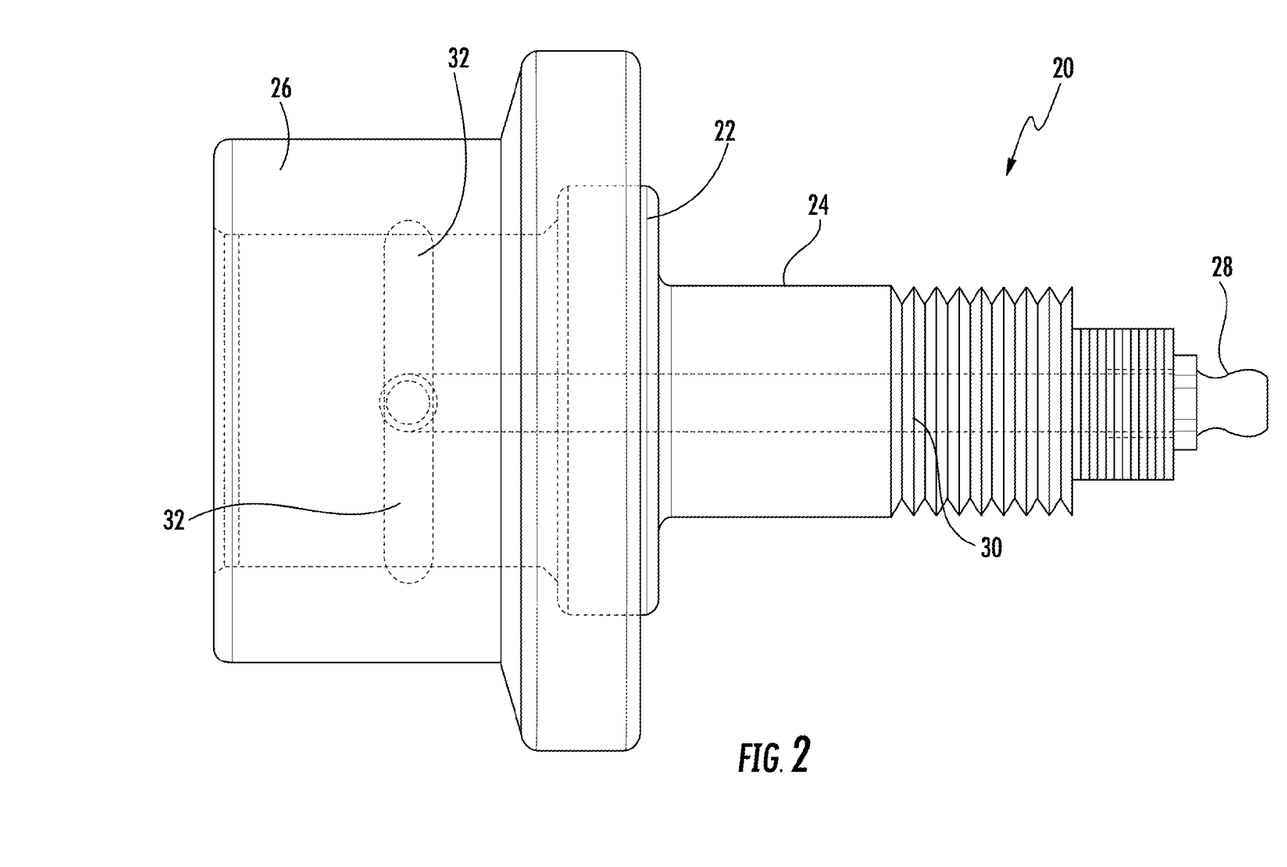
FIG. 2 is a side view of the first embodiment of the cam follower roller assembly.

Referring to FIGS. 1-2, a first embodiment of a cam follower roller assembly 20 is shown. The first embodiment has a shoulder 22 on a shaft 24 that can be selectively inserted into a cavity 33 of a roller 26. The shaft 24 has a first end 25 and a second end 27. The shoulder 22 is positioned between the first end 25 and the second end 27. Preferably, the shaft 24 has a first section 34 and a second section 36. The first section 34 has a threaded portion 42 at the first end 25. The first section 34 preferably has a diameter that is less than a diameter of the second section 36.

Again referring to FIGS. 1-2, the roller 26 has an edge 38 on an inside surface 39 of the roller 26. The shoulder 22 has a bottom 40 and a top 41. When the shaft 24 is inserted into the roller 26, the bottom 40 of shoulder 22 makes contact with the edge 38 of the roller 26. The second section 36 of the shaft 24 floats within the roller 26.

As best seen in FIG. 2, the shaft 24 has a channel 30 that branches out into secondary channels 32. A zerk 28 is attachable to shaft 24 such that zerk 28 is in communication with the channel 30. During operation of the assembly 20, lubricant can be added to zerk 28. Lubricant then travels through channel 30 and then to secondary channels 32. Accordingly, lubricant can reach the roller 26 where the roller makes contact with the shaft 24 and shoulder 22.

Figure 10:
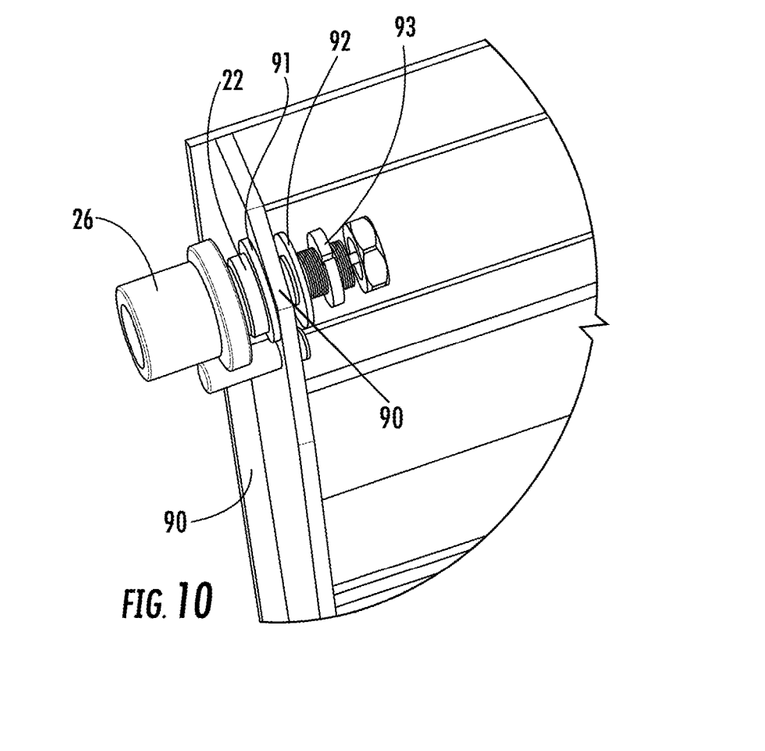
FIG. 10 is a perspective view of the first embodiment attached to a frame of a structure.

A fastener 43 can be positioned on the threaded portion 42 such that the shaft 24 can be positioned in a variety of positions depending on the application of the cam follower roller system 20. As shown in FIG. 10, the cam follower roller assembly 20 is shown in an exploded view wherein the cam follower roller assembly 20 is attached to a structure 90. The shaft 24 is inserted through an opening in the structure. A flat washer 92, a split lock washer 93 and the fastener 43 secure the assembly 20 to the structure 90. A flat washer 91 is positioned between the structure 90 and the shoulder 22 and then the roller 26 is positioned.

Figure 3:
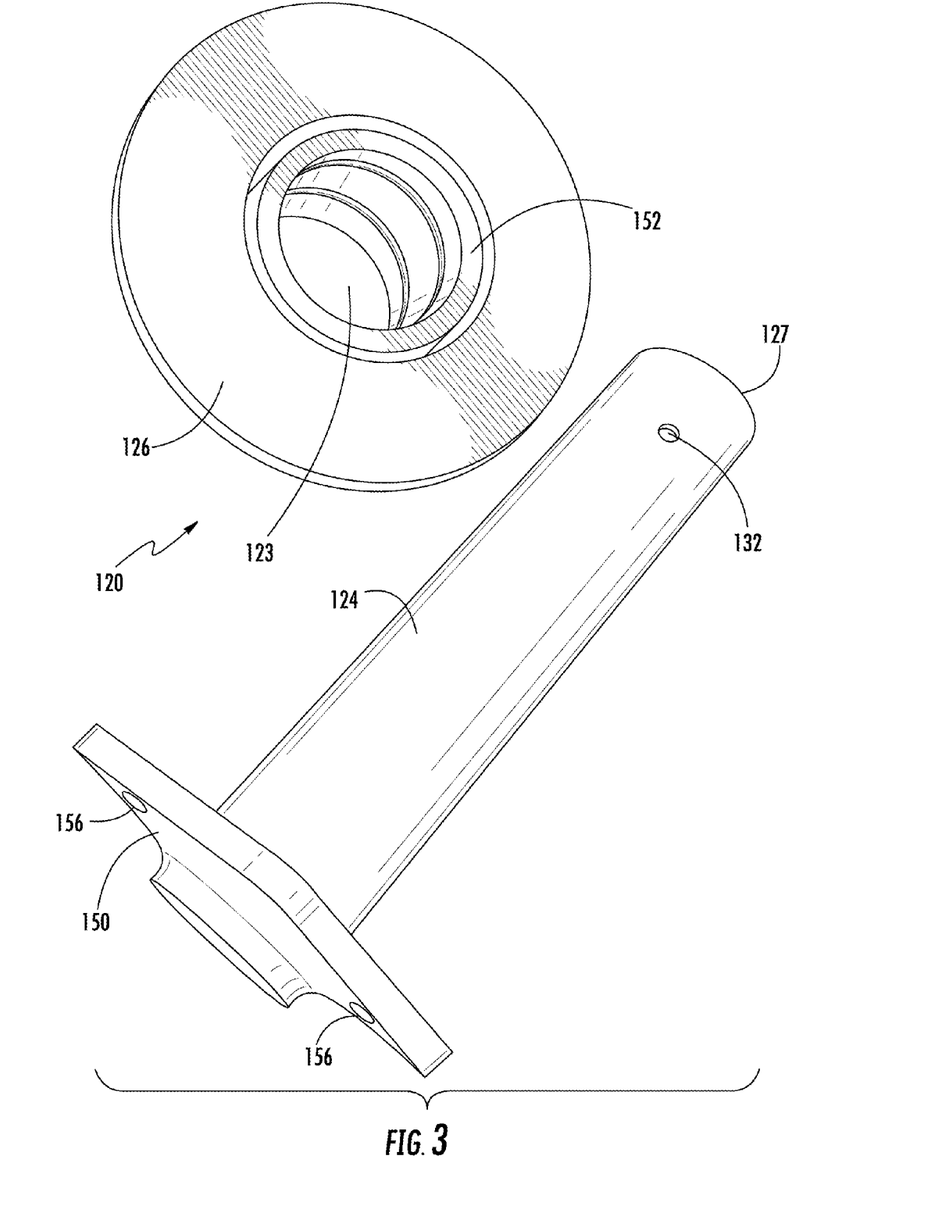
FIG. 3 is a perspective view of a second embodiment of certain parts of a cam follower roller assembly.
Figure 4:
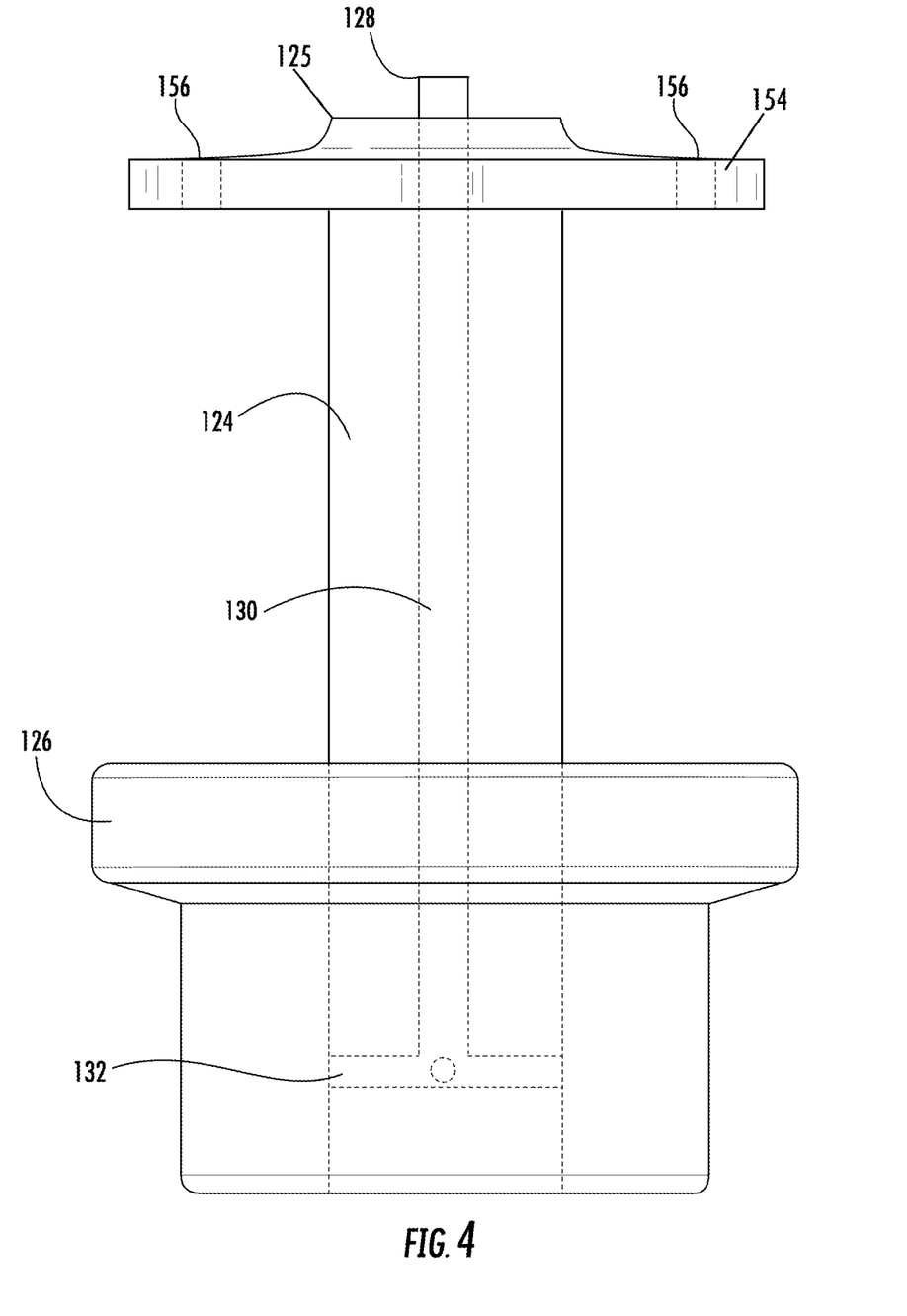
FIG. 4 is a side view of the second embodiment of certain parts of the cam follower roller assembly.

Now in FIGS. 3-4, certain parts of a second embodiment of a cam follower roller assembly 120 are shown. This second embodiment is similar to the first embodiment, however, the shaft 124 does not include a shoulder. The shaft 124 can still be selectively inserted into a cavity 123 of a roller 126.

The shaft 124 has a first end 125 and a second end 127. A mounting member 150 is at the first end 125. Again referring to FIGS. 3-4, the roller 126 is adjacent a bushing insert 152. When the shaft 124 is inserted into the roller 126, the shaft slides through the cavity 123.

As best seen in FIG. 4, the shaft 126 has a channel 130 that branches out into secondary channels 132. A zerk 128 is attachable to shaft 126 such that zerk 128 is in communication with the channel 130. During operation of the assembly 120, lubricant can be added to zerk 128. Lubricant then travels through channel 130 and then to secondary channels 132. Accordingly, lubricant can reach the roller 126 where the bushing insert 152 makes contact with the shaft 124.

The mounting member 150 comprises a pin flange 154 that has openings 156. When being fastened to an existing device, a fastener 143 such as a bolt can be positioned through each opening 156 and secured to a structure such as a pin plate utilizing nut 192. The parts listed above are preferably made of metal.

Figure 5:
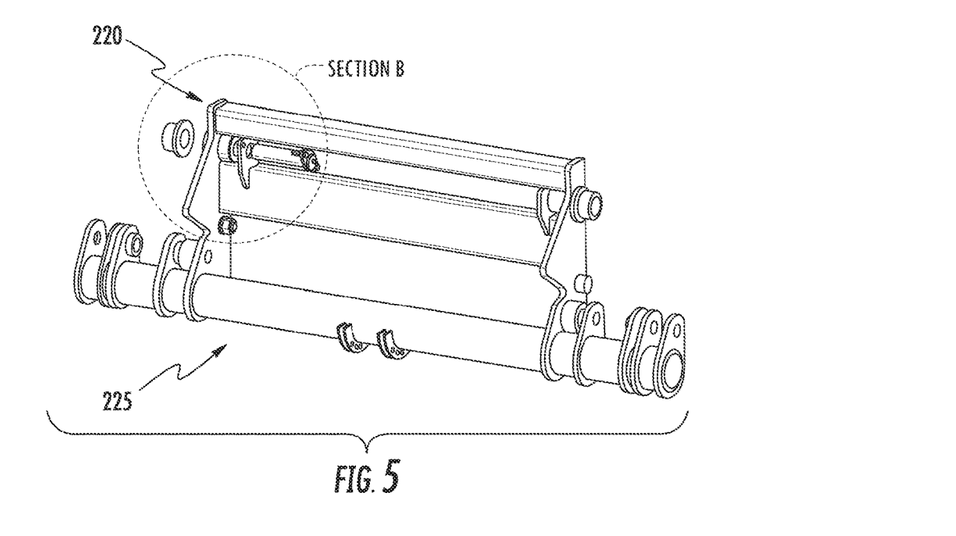
FIG. 5 is a perspective view of the second embodiment of the cam follower roller assembly on a loading mechanism in a partial exploded view.
Figure 6:
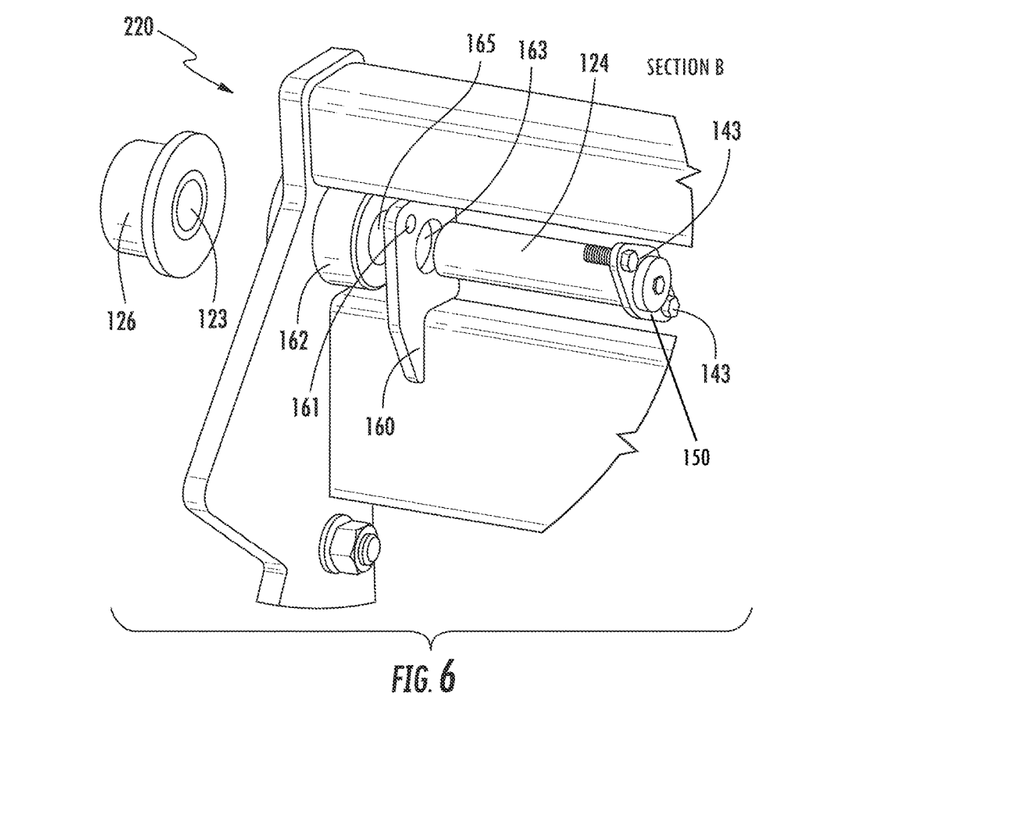
FIG. 6 is a detail of Section B of FIG. 5.
Figure 7:
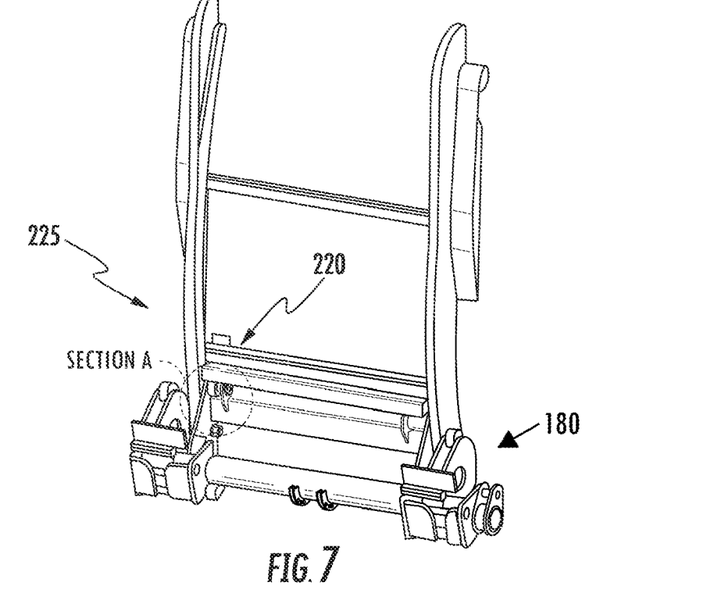
FIG. 7 is a perspective view of the second embodiment of the cam follower roller assembly on a loading mechanism.
Figure 8:
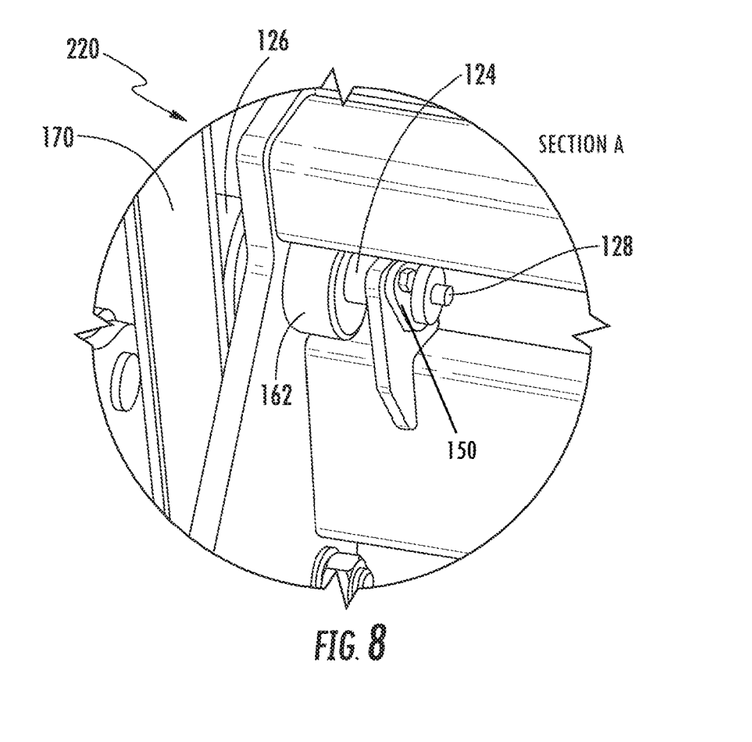
FIG. 8 is a detail of Section A of FIG. 7.
Figure 9:
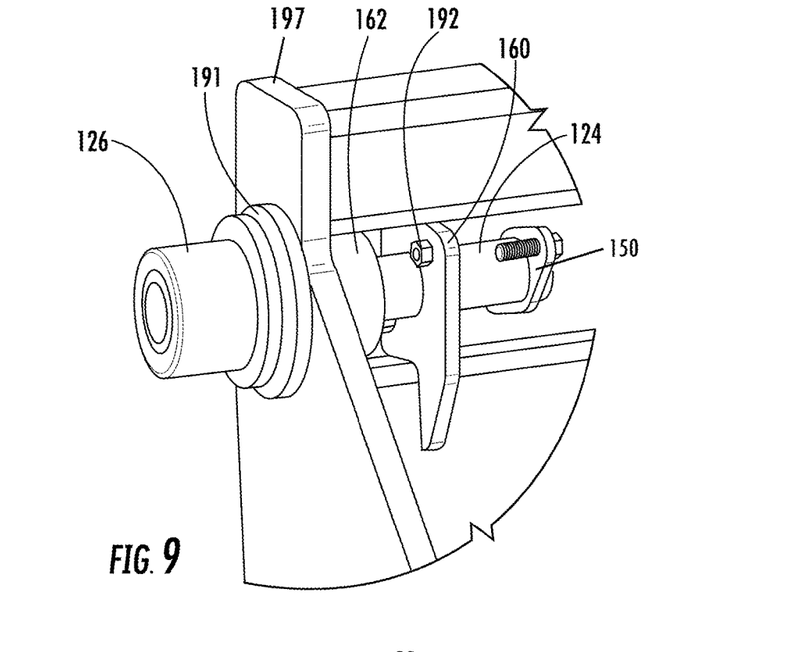
FIG. 9 is a detail of Section A of FIG. 7 from a different perspective.

Now referring to FIGS. 5-9, a cam follower roller system 220 is detailed which utilizes the second embodiment shown in FIGS. 3-4 in the application of a lifting mechanism or carriage 225 of a trash collection vehicle (not shown). For this particular application, additional parts are utilized such that the cam follow roller system can easily be mounted and removed from the carriage 225 without the need to disassemble any other part of the carriage 225. FIGS. 5-6 and 9 show the parts of cam follower roller system 220 in a partially exploded position, while FIGS. 7-8 show then in a non-exploded view.

For the embodiment shown in FIGS. 5-8, the cam follower roller system 220 comprises a shaft 124, a pin plate 160, a support boss 162, and a roller 126. As seen best in FIGS. 6 and 8, the shaft 124 is inserted through an opening 163 in the pin plate 160, then through opening 165 in the support boss 162, and the finally through the cavity 123 of the roller 126. As shown in FIG. 8, a rail 170 makes contact with the roller 126. Additionally, a thrust washer 191 can be placed between the roller 126 and a frame 197 of the carriage 225.

Fasteners 143 are placed through the openings 156 of the pin flange 154 of the mounting member 150 and are fastened to secondary openings 161 of the pin plate 160 via bolts and nuts 192. The system 220 also preferably includes the zerk 128, channels 130 and secondary channels 132 such that the roller 126 and bushing insert 152 can be lubricated.

In operation of the specific application shown in FIGS. 7-9, as the grabbing member 180 is lifted vertically up the rails 170, the roller 126 and bushing 152 rotate while the shaft 124 does not as it is fixed. The rail 170 is positioned such that it prevents the roller 126 from falling off the end of the shaft 124.

It is to be understood that the embodiments described above can be utilized for a variety of applications in which it would be beneficial to have cam follower roller assemblies that can be detached from other structures and mechanisms without having to take apart those other structures and mechanisms. As for the specific application involving a carriage of a refuse collection vehicle shown in FIGS. 5-9, the additional parts described are utilized in the preferred embodiment for that particular application.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

The invention claimed is:

1. A cam follower roller assembly for a trash collection vehicle carriage, comprising:
   a shaft;
   a roller;
   the shaft insertable into the roller;
   the shaft has a first end and a second end;
   a zerk;
   the shaft having a channel;
   the shaft having at least one secondary channel;
   wherein a lubricant can flow through the zerk, the channel and the at least one secondary channel to lubricate a portion of the cam follower roller assembly;
   the shaft has a shoulder;
   the shoulder between the first end and the second end of the shaft;
   the roller having an inner edge;
   the shoulder having a bottom;
   the bottom of the shoulder making continuous contact with the inner edge for an entirety of a circumference of the bottom of the shoulder;
   wherein the bottom of the shoulder is
   a bearing surface; the shaft and the shoulder are rotatable within the roller;
   the shoulder having a diameter greater than any diameter of the shaft;
   wherein the diameter of the shoulder mitigates rocking of the shaft within the roller.

2. The cam follower roller assembly of claim 1, wherein:
   the shaft has a first section and a second section;
   the first section has a threaded portion.

3. The cam follower roller assembly of claim 2, wherein;
   a fastener can be selectively attached to the threaded portion.

4. The cam follower roller assembly of claim 3, wherein:
   the first section has a first diameter;
   the second section has a second diameter;
   the second diameter of the second section is greater than the first diameter of the first section.

5. A cam follower roller assembly for a trash collection vehicle carriage, comprising:
   a shaft;
   a roller;
   the shaft insertable into the roller;
   a zerk;
   the shaft having a channel;
   wherein a lubricant can flow through the zerk and the channel to lubricate a portion of the cam follower roller assembly;
   a mounting member;
   the mounting member having a pin flange;
   the pin flange configured to attach to a pin plate of the trash collection vehicle carriage;
   the pin flange being directly attached to the pin plate;
   a first surface of the pin flange in contact with a second surface of the pin plate;
   the pin flange and the pin plate do not rotate;
   wherein the cam follower roller assembly is configured to be removed from the trash collection vehicle carriage without having to take apart the trash collection vehicle carriage.

6. The cam follower roller assembly of claim 5, further comprising:
   a bushing insert;
   the bushing insert is placed on an inside portion of the roller.

7. The cam follower roller assembly of claim 6, wherein:
   the shaft has at least one opening;
   the at least one opening is in fluid communication with the channel.

8. A cam follower roller assembly for a trash collection vehicle carriage assembly, comprising:
   a roller;

a shaft;
the shaft insertable into the roller;
a mounting member;
the mounting member having a pin flange;
the mounting member configured to attach to a pin plate of the trash collection vehicle carriage;
the mounting member directly attached to the pin plate;
a first surface of the pin flange in contact with a second surface of the pin plate;
the pin flange and the pin plate do not rotate;
wherein the roller and the pin plate are configured to be bisected by a portion of a frame of the trash collection vehicle carriage assembly;
wherein the cam follower roller assembly is configured to be removed from the trash collection vehicle carriage assembly without having to take apart the trash collection vehicle carriage assembly.

9. The cam follower roller assembly of claim 8, further comprising:
a support boss;
the shaft insertable through the support boss.

10. The cam follower roller assembly of claim 9, further comprising:
a zerk;
the shaft having a channel;
wherein a lubricant can flow through the zerk and the channel to lubricate a portion of the cam follower roller assembly.

11. The cam follower roller assembly of claim 10, further comprising:
a secondary channel;
the secondary channel in fluid communication with the channel.

* * * * *